Aug. 21, 1928.
A. R. PRIBIL
OIL GAUGE
Filed Jan. 15, 1924
1,681,431
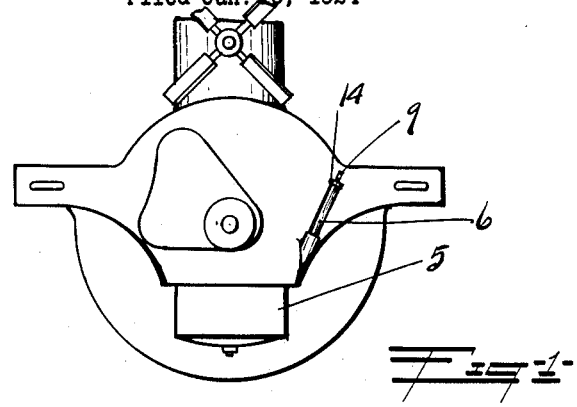
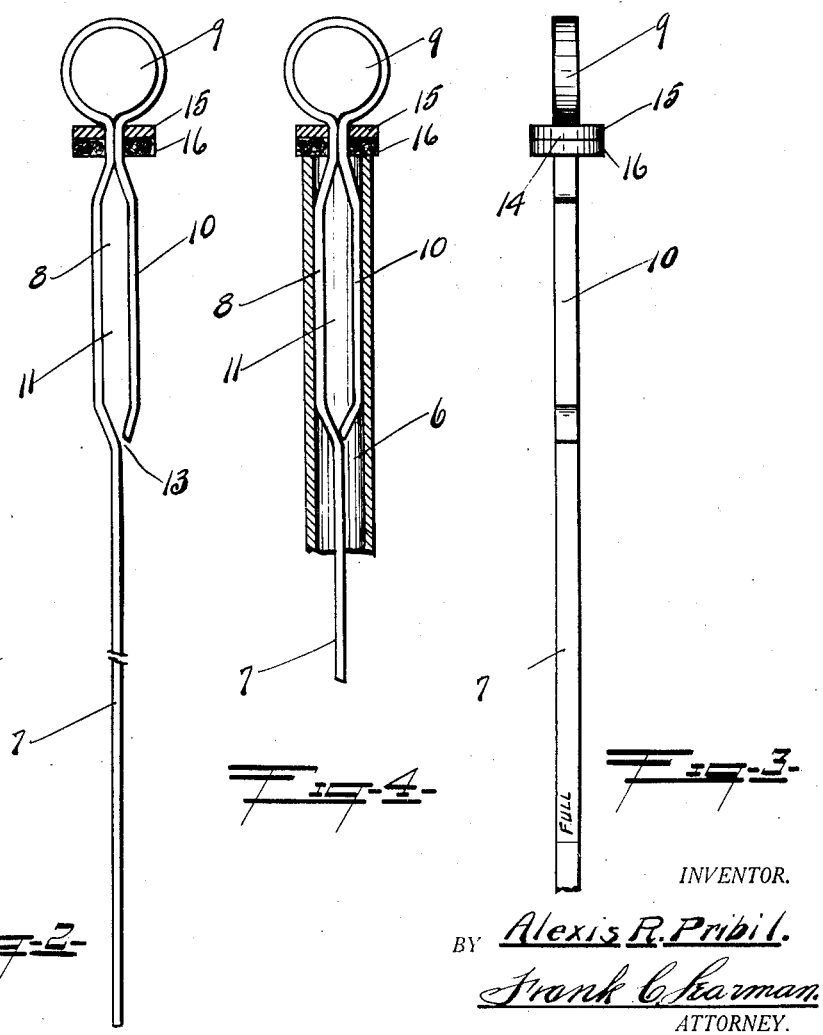
INVENTOR.
BY *Alexis R. Pribil.*
*Frank C. Searman.*
ATTORNEY.

Patented Aug. 21, 1928.

1,681,431

UNITED STATES PATENT OFFICE.

ALEXIS R. PRIBIL, OF SAGINAW, MICHIGAN.

OIL GAUGE.

Application filed January 15, 1924. Serial No. 686,251.

This invention relates to oil gauges and the like, and particularly to an ullage rod for testing and determining the oil level in the crank case of an internal combustion engine.

The prime object of the invention is to design a simple and cheap gauge constructed of one continuous strip of material.

Another object of the invention is to provide an oil gauge which is very economical to manufacture, and which has greater resilient qualities than are present in the conventional oil gauge at present in use.

A further object is to provide very simple and inexpensive means on the gauge to form a stopper for the oil well.

The above and other objects will appear as the description progresses, reference being had to the accompanying drawing, in which like reference numerals indicate like parts throughout the several views thereof.

In the drawing:

Fig. 1 is a front view of an internal combustion engine showing my improved oil gauge in place thereon.

Fig. 2 is an enlarged edge elevation of the ullage rod.

Fig. 3 is a side view thereof.

Fig. 4 is a fragmentary edge view illustrating the gauge rod in place, the neck of the gauge tube being shown in section.

Referring now particularly to the drawing in which I have shown the preferred embodiment of my invention. The numeral 5 indicates the crank case of an internal combustion engine having a gauge tube 6 through which the oil level is determined by use of the gauge rod, said gauge rod normally being resiliently and slidably mounted in the gauge tube, and is provided with a stopper to prevent escape of oil therethrough.

The gauge proper comprises an ullage rod 7 formed of a single strip of material of a predetermined length to extend through tube 6 into the crank case of the engine, the section 8 of this strip being bent outwardly as clearly shown in Figs. 2 and 4, and an eye 9 being formed directly adjacent thereto, to facilitate the handling of the gauge rod, the sides of the strip being brought together for a short distance directly below the eye. The end section 10 is then bent in substantially the same manner as the section 8 and when formed to shape, these sections 8 and 10 are parallel to each other and are spaced apart to form an elongated opening 11 therebetween. The end of the material section 10 is bent inwardly toward the main body and is spaced therefrom to form a throat or opening 13, which imparts additional resiliency thereto.

A washer member 14 is mounted on the member 7 directly below the eye, and comprises a metal top 15 having a felt 16 adjacent thereto, and when in position on the engine this closes the opening in the tube 6 and prevents the escape of oil therethrough.

Suitable graduations can be provided on the gauge for indicating the low, medium, or high level of oil in the crank case.

When testing the level of the oil, the gauge is withdrawn and the rod 7 wiped dry on a piece of cloth or waste. It is then inserted in the crank case through tube 6 and withdrawn, and the oil level will be clearly shown thereon.

As above explained the gauge rod 7 is held in position and prevented from rattling by the frictional engagement of the sections 8 and 10 with the inner surface of the pipe or tube 6.

From the foregoing description it will be apparent that I have perfected a very simple and economical oil gauge formed of a single piece of material.

What I claim is:—

1. An ullage rod formed from a resilient and substantially flat metal strip bent near one end to provide a looped handle, the portion between said end and said loop and a corresponding portion on the other side of the loop being bowed away from each other to form cooperating spring members just below the handle, the spring members being constructed and arranged frictionally and yieldingly to grip the opposite walls of an opening in a crank-case to hold said member with its lower end projecting downwardly into the oil.

2. An ullage rod formed from a resilient strip comprising a straight portion, an outwardly pressed portion integral with and adjacent said straight portion, an integral loop beyond said outwardly pressed portion, a dependent outwardly pressed portion on said loop to cooperate with the first mentioned outwardly pressed portion to frictionally and yieldingly grip the opposite walls of an opening in a crankcase to hold said rod with its straight end projecting downwardly into the oil.

3. An ullage rod consisting of a single strip of material adapted to extend downwardly into a liquid container having one end reversely bent upon itself to form a spring loop for frictional engagement with the container.

4. An ullage rod including a single strip of material adapted to extend downwardly into a liquid container, and having one end reversely bent into a looped handle portion with a dependent spring finger for frictional engagement with the wall of the container.

5. An ullage rod to measure the liquid contents of a container and to be removably carried thereby, including a strip of material adapted to extend through an opening in the container, and having one end reversely bent to form a looped handle portion with a restricted neck and a dependent spring finger, which is adapted to cooperate with the adjacent portion of the strip to frictionally grip the walls of the opening, and a packing member and backing plate therefor carried by the rod and having openings through which the restricted neck extends and being adapted to act as a closure for the opening and as a stop for the rod.

In testimony whereof I affix my signature.

ALEXIS R. PRIBIL.